United States Patent [19]

Rodrigues et al.

[11] Patent Number: 5,398,759
[45] Date of Patent: Mar. 21, 1995

[54] SET RETARDED ULTRA FINE CEMENT COMPOSITIONS AND METHODS

[75] Inventors: Klein A. Rodrigues, Duncan; Donald W. Lindsey, Marlow, both of Okla.

[73] Assignee: Halliburton Company, Duncan, Okla.

[21] Appl. No.: 171,543

[22] Filed: Dec. 21, 1993

[51] Int. Cl.6 .............................................. E21B 33/13
[52] U.S. Cl. .................................. 166/293; 106/714; 106/808
[58] Field of Search ............... 166/292, 293; 106/724, 106/728, 810, 823

[56] References Cited

U.S. PATENT DOCUMENTS

| | | | |
|---|---|---|---|
| 4,555,269 | 11/1985 | Rao et al. | 166/293 X |
| 4,557,763 | 12/1985 | George et al. | 166/293 X |
| 4,676,832 | 6/1987 | Childs et al. | 166/293 X |
| 5,086,850 | 2/1992 | Harris et al. | 166/292 X |
| 5,125,455 | 6/1992 | Harris et al. | 166/292 |
| 5,263,542 | 11/1993 | Brothers | 166/293 |

OTHER PUBLICATIONS

Hampel, Clifford A. et al., *Glossary of Chemical Terms* Second Edition, Van Nostrand Reinhold Company, 1982, p. 11.

Miles, "Material Safety Data Sheet", Oct. 15, 1990.

*Primary Examiner*—George A. Suchfield
*Attorney, Agent, or Firm*—Robert A. Kent

[57] ABSTRACT

Set retarded ultra fine cement compositions which remain pumpable for a predictable period of time at temperatures up to about 400° F. are provided. The compositions are basically comprised of an ultra fine hydraulic cement, sufficient water to form a pumpable slurry and a set retarder comprised of a water soluble aliphatic compound containing at least three carbon atoms and at least one phosphonic acid or phosphonate group.

8 Claims, No Drawings

SET RETARDED ULTRA FINE CEMENT COMPOSITIONS AND METHODS

BACKGROUND OF THE INVENTION

1. Field of the Invention

The present invention relates generally to cement compositions utilized in the completion and repair of wells, and more particularly, to set retarded ultra fine cement compositions and methods of their use.

2. Description of the Prior Art

In cementing operations such as those carried out in completing and repairing oil, gas and water wells, a hydraulic cement composition is prepared by mixing a hydraulic cement with water and other additives, the composition is placed into a subterranean zone to be cemented and allowed to set therein into a hard substantially impermeable mass.

In the operation of wells used in the recovery of fluids from or the introduction of fluids into subterranean formations problems relating to the unwanted passage of fluids and/or fine solids into or from undesirable locations in the formation or wellbore sometimes occur. This unwanted passage of fluids and/or fine solids can severely disrupt or terminate the desired operation of a well.

The problems involving the unwanted passage of fluids referred to above, ordinarily involve the movement of fluids, such as oil, gas or water through very small undesirable openings. These problems are not unique and the solutions have traditionally involved apparatus, methods and compositions adapted to cover, seal or to otherwise plug the openings to thereby terminate the unwanted passage of fluid through the openings. The openings referred to above include: holes or cracks in well casing; spaces such as holes, cracks, voids or channels in the cement sheath deposited in the annular space between the formation face and well casing; very small spaces—called microannuli—between the cement sheath referred to above, and the exterior surface of the well casing or formation; and permeable spaces in gravel packs and formations.

It is clear that holes or cracks in well casing and/or cement sheath can permit the unwanted and therefore uncontrolled passage of fluids therethrough. Sometimes, of course, holes are deliberately made in casing and sheath by a known process called perforating in order to permit the controlled recovery of fluid from a formation or to permit the controlled introduction of fluid into a formation. The sealing or plugging of such holes or cracks, whether or not made deliberately, has been conducted by attempts to place or otherwise force a substance into the hole or crack and permitting it to remain therein to thereby plug the opening. Naturally, the substance will not plug the opening if it will not enter the opening. If the substance does not fit then, at best, a bridge, patch, or skin may be formed over the opening to produce, perhaps, a temporary termination of the unwanted fluid flow.

Substances used in methods to terminate the unwanted passage of fluids through holes or cracks in casing and/or sheath have been compositions comprised of hydraulic cement, wherein the methods employ hydraulic pressure to force a water slurry of the cement into the cracks and holes wherein the cement is permitted to harden. These methods are variously referred to in the art as squeeze cementing, squeezing or as squeeze jobs. The success of squeezing hydraulic cement into such holes and cracks is, among other factors, a function of the size of the hole relative to the particle size of the cement as well as the properties of the slurry. As mentioned earlier, if the particle size of the cement is greater than the crack width, the cement will not enter and at best a patch instead of a plug is the result. A problem therefore is to substantially reduce cement particle size without reducing the hardening and strength characteristics of hydraulic cement.

During the construction of a well it is known to place a volume of a water slurry of a hydraulic cement into the annular space between the walls of the wellbore and the exterior of the casing wherein the cement is permitted to solidify to thereby form an annular sheath of hardened cement. The objective of the sheath, the construction of which is referred to as primary cementing, includes physical support and positioning of the casing in the borehole and prevention of unwanted fluid (liquid and gas) migration between various formations penetrated by the wellbore. If, for some reason, the hardened sheath contains spaces such as voids, cracks or channels due to problems involved in the placement of the slurry it is clear that the sheath may not be capable of providing the desired objectives. Accordingly, by employing known techniques to locate the voids, channels or cracks, a perforation penetrating the spaces can be made in the casing and sheath and cement then squeezed into the spaces via the perforation so as to place the sheath in a more desirable condition for protecting and supporting the casing and providing fluid flow control. As mentioned earlier, the success of the squeeze job is at least a function of the size of the space or spaces to be filled relative to the particle size of the cement.

Another problem incidental to the formation of the cement sheath revolves about the occasional failure of the sheath to tightly bond to the exterior wall of the casing or the interior of the borehole. This failure can produce a very thin annular space called a microannulus between the exterior wall of the casing and the sheath or the sheath and the borehole. For the reasons already discussed, it is important to place a substance, such as a hydraulic cement, in the microannulus to enable the sheath to fully provide the intended benefits. Again, as stated above, the success of squeezing cement into a microannulus space is dependent upon the relative size of the space and the particle size of the cement.

The solid portions of some producing formations are not sufficiently stable and therefore tend to break down into small pieces under the influence of the pressure difference between the formation and the wellbore. When fluid, such as oil or water, flows under the influence of the pressure difference from the formation to the wellbore the small pieces referred to above can be carried with the fluid into the wellbore. Over a period of time, these pieces can build up and eventually damage the well and associated equipment and terminate production. The art has solved this problem by placing in the wellbore a production aid which is referred to in the art as a gravel pack. A gravel pack is usually comprised of a mass of sand within the interior of a well. The sand bed completely surrounds a length of tubular goods containing very narrow slots or small holes; such goods are sometimes referred to as slotted liners or sand screens. The slots or holes permit the flow of fluid therethrough but are too narrow to permit the passage of the sand. The slotted liner or sand screen can be connected through a packer situated up-hole of the gravel pack to production tubing extended from the wellhead. The gravel pack ordinarily consists of siliceous material having sand grains in the range of from about 10 to about 100 mesh.

The gravel pack, which can be situated in the casing in the perforated interval, traps the small pieces of formation material, for convenience herein referred to as formation fines or sand, which flows from the formation with the fluid through the perforations and into the gravel pack. Accordingly, neither formation sand nor gravel pack sand penetrates the slotted tubing and only fluid is permitted to pass into the tubular goods.

The above expedient performs nicely until undesired fluid begins to penetrate the gravel pack from the formation. At that point the flow of undesired fluid, such as water, must be terminated preferably in a way which will not necessitate removal of the gravel pack.

The problems referred to above uniformly deal with the unwanted passage of materials into or from very small undesirable openings in a well, including the cement sheath constructed during a primary cementing procedure. Still another problem involved in the construction and repair of wells involves the primary cementing procedure itself.

Primary cementing, as described above, is conducted during the construction of a well and involves the placement of a volume of a slurry of a hydraulic cement and water into the annular space between the walls of the wellbore and the exterior of primary casing such as conductor pipe, surface casing, and intermediate and production strings. The slurry is permitted to solidify in the annulus to form a sheath of hardened cement, the purpose of which is to provide physical support and positioning of the casing in the wellbore and to isolate various formations penetrated by the wellbore one from another.

A problem encountered during primary cementing is centered upon the weight (that is the density) of the slurry itself. In certain circumstances the hydrostatic pressure developed by a column of slurry overcomes the resistance offered by a formation in which case the formation fractures or otherwise breaks downwith the result that a portion of the slurry enters the formation and the desired sheath is not formed. The formation breakdown thus occurs prior in time to development of sufficient rigidity or hardening of the cement to enable it to be self-supporting.

One solution has been to reduce the density of the slurry so that the pressure developed by the required slurry height will not exceed the ability of the formation to resist breakdown. This expedient can result in sheaths having physical deficiencies such as reduced strength or increased permeability or both. Another solution has been to reduce the weight of the slurry while maintaining density by reducing the quantity of slurry pumped in a single lift or stage to thus reduce the height of slurry. This expedient requires several separate stages in order to produce the required sheath length. Time must pass between stages in order to permit previous stages to develop strength sufficient to support the weight of succeeding stages. The time expended waiting on cement to set is lost time in the process of constructing the well.

Still another problem involved in the operation of wells revolves about the unwanted movement of water via cracks and fractures in the subterranean formation, whether naturally occurring or deliberately produced, from the formation into the wellbore. Terminating this water movement may require remedial efforts other than those referred to previously which feature plugging perforations, holes, cracks and the like in casing, cement sheath and gravel packs, all of which occur within the confines of the wellbore itself.

Recently, a better solution to all of the problems mentioned above has been developed and utilized successfully. The solution involves the use of ultra fine hydraulic cement compositions and is described in detail, for example, in U.S. Pat. No. 5,086,850 issued on Feb. 11, 1992 to Harris, et al. The ultra fine cement compositions and methods described in U.S. Pat. No. 5,086,850 have been utilized successfully in primary cementing, squeeze cementing and the other forms of well cementing mentioned. However, a problem which has persisted in the use of ultra fine cement compositions occurs when the compositions are subjected to high temperatures, i.e., temperatures in the general range of from about 140° F. to about 250° F. In carrying out cementing operations of the type described above in deep hot wells, the ultra fine cement composition is heated to temperatures in the above mentioned range which, heretofore, has often caused premature gelling of the cement composition and the very severe problems attendant thereto. While prior art set retarders have been included in the ultra fine cement compositions, e.g., lignosulfonates, predictable retardation of the compositions at temperatures above about 140° F. has not been obtained.

Brothers, in U.S. Pat. No. 5,263,542, addressed the problems attendant upon the use of ultra fine cement compositions at temperatures above 140° F. and up to about 245° F. Brothers thus discloses the use of a set retarder comprised of a methylenephosphonic acid derivative.

In spite of the contribution of Brothers, there remains a need for a set retarded ultra fine cement composition which remains pumpable for a predictable period of time and for methods of using such composition in remedial cementing and primary cementing operations.

SUMMARY OF THE INVENTION

By the present invention, there is provided a method of retarding the set of a slurry of an ultra fine cement in water at temperatures in the range of from about 140° F. to about 400° F. comprising adding to the slurry, as a set retarding additive, a water soluble aliphatic compound containing at least three carbon atoms and at least one phosphonic acid or phosphonate group. There is also provided by this invention a set retarded ultra fine cement composition which remains pumpable for a predictable period of time at temperatures in the range of from about 140° F. to about 400° F. and methods of using such compositions in primary and secondary well cementing operations. The set retarded composition of this invention is comprised of an ultra fine hydraulic cement having a particle size no greater than about 30 microns and a Blaine Fineness no less than about 6000 square centimeters per gram, sufficient water to form a pumpable slurry and the set retarder of this invention present in the slurry in an amount in the range of from about 0.01 pound to about 5.0 pounds per 100 pounds of dry cement therein. The set retarder of this invention is a water soluble aliphatic compound containing at least 3 carbon atoms and at least one functional group selected from the groups consisting of phosphonic acid groups, phosphonate groups, carboxylic acid groups, carboxylate groups and mixtures thereof wherein at least one of said functional groups is a phosphonic acid group or a phosphonate group.

Compounds within the scope of the above definition preferred for use herein are further defined by the formula:

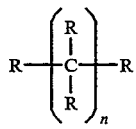
(1)

wherein R is —H,

or —P(OX)$_3$, X is —H, Na or K and n is 3, 4, 5, or 6 and wherein at least one of said R groups is —P(OX)$_3$.

The compound most preferred for use herein is the partially neutralized sodium salt of the compound 2-phosphono-1,2,4 butanetricarboxylic acid, a 25 weight percent aqueous solution, having a pH of about 2.4, the formula of which is

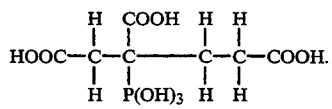

It is, therefore, a general object of the present invention to provide set retarded ultra fine cement compositions and methods.

Other objects, features and advantages of the present invention will be readily apparent to those skilled in the art upon a reading of the description of preferred embodiments which follows.

DESCRIPTION OF PREFERRED EMBODIMENTS

The set retarded ultra fine cement compositions of this invention remain pumpable for a predictable period of time at temperatures above about 140° F. and up to about 400° F. whereby the cement compositions can be pumped into a zone to be treated without fear of premature gelation occurring. It is understood by those skilled in the art, that when a cement composition develops gel strength prior to being placed, the composition can become unpumpable and can set in undesirable locations such as in the wellbore, in conduits disposed in the wellbore or in surface pipe and equipment.

The term "gelation," when used in connection with a cement slurry, is a reference to the development by the slurry of viscosity without concurrent development of compressive strength. Ordinary development of viscosity by a cement slurry to the extent that the slurry cannot be pumped is referred to herein as "thickening time" or as "pumping time" and is defined as the time required for a slurry to develop 70 Bearden Units of consistency, or 70 Bc units, after the slurry is made. (See API Specification 10, 3rd Edition, Jul. 1, 1986 at Section 8)

A cement slurry considered herein to be useful in performing oil well cementing operations, among other things, has a pumping time in the range of from about 2 to about 6 hours depending upon temperature. Accordingly, a slurry which becomes unpumpable due to viscosity increase in a period of time less than about 2 hours, or less than expected, as based upon previous laboratory testing, is said to have experienced premature gelation. The ultra fine cement compositions of this invention do not experience premature gelation.

The compositions of this invention are comprised of ultra fine hydraulic cement, sufficient water to form a pumpable slurry and a set retarder which causes the composition to remain pumpable for a predetermined period of time before gelation and setting of the composition occurs.

The ultra fine hydraulic cement is comprised of particles of cementitious material having diameters no larger than about 30 microns, preferably no larger than about 17 microns, and still more preferably no larger than about 11 microns. The distribution of various sized particles within the cementitious material, i.e., the particle size distribution, features 90 percent of them having a diameter not greater than about 25 microns, preferably about 10 microns and still more preferably about 7 microns, 50 percent having a diameter not greater than about 10 microns, preferably about 6 microns and still more preferably about 4 microns and 20 percent of the particles having a diameter not greater than about 5 microns, preferably about 3 microns and still more preferably about 2 microns.

The particle size of hydraulic cement can also be indirectly expressed in terms of the surface area per unit weight of a given sample of material. This value, sometimes referred to as Blaine Fineness or as specific surface area, can be expressed in units of square centimeters per gram (cm$^2$/gram), and is an indication of the ability of a cementitious material to chemically interact with other materials. Reactivity is believed to increase with increase in Blaine Fineness. The Blaine Fineness of the hydraulic cement used in the cementing methods of this invention is no less than about 6000 cm$^2$/gram. The value is preferably greater than about 7000, more preferably about 10,000, and still more preferably greater than about 13,000 cm$^2$/gram.

Cementitious materials of particle size and fineness as set out above are disclosed in various prior U.S. Patents including U.S. Pat. No. 4,761,183 to Clark, which is drawn to slag, as defined herein, and mixtures thereof with Portland cement, and U.S. Pat. No. 4,160,674 to Sawyer, which is drawn to Portland cement. The cementitious materials preferred for use in this invention are Portland cement and combinations thereof with slag wherein the quantity of Portland cement included in any mixture of Portland cement and slag used can be as low as 10 percent but is preferably no less than about 40 percent, more preferably about 60 percent, still more preferably about 80 percent and most preferably 100% Portland cement by weight of mixture.

Some of the problems solved by the use of a cementitious material of very small particle size are attributable to the ability of the material to pass through very narrow openings and penetrate into low permeability gravel packs and formations. To solve other problems described above, the material when slurried in water must exhibit a sufficiently low slurry density to enable use in situations requiring a light-weight cement which nevertheless develops satisfactory compressive strength. In this regard the large surface area of the cement, i.e., the Blaine Fineness, renders it more reactive than cements of lower Blaine Fineness; accordingly, quantities of water greater than quantities usually employed in well cementing operations can be employed to thereby enable the formulation of slurries of low density and low viscosity without unsatisfactory loss in strength.

Thus, slurries useful herein can be formulated utilizing ratios of the weight of water per unit weight of cementitious material in the range of from about 0.5 to about 5.0, preferably from about 1.0 to about 1.75 and still more preferably from about 1.0 to about 1.5 pounds water per pound of cementitious material. Water to cement ratios in excess of about 1.75 and up to about 5.0 can be formulated for highly specialized applications requiring slurries of very low density and very low viscosity. It is noted, however, that slurries having such high water ratios tend to exhibit free water separation and excessive solids settling. Additives can be utilized to control free water separation and solids settling.

The slurry densities of the fine cements of this invention are lower than cements having usual particle sizes because of the high water ratios required to wet all of the surface area of the fine cement. The compressive strengths, however, of the set lower density slurries are satisfactory for both primary cementing and remedial cementing purposes especially in view of the greater reactivity of the fine cements. Also, and particularly in the case of slurries formulated at high water ratios, where penetration into very small holes, cracks and openings is the goal, water may indeed be eventually forced out of the fine penetrating particles to thereby deposit in the target crack, opening or porosity a dense, high-strength and highly water impermeable mass of set cement.

Considering the range of water-to-cement ratios disclosed above, the densities of slurries which can be formulated utilizing the fine cement of this invention are in the range from about 9.4 to about 14.9, preferably from about 11.0 to about 12.5 and still more preferably in the range of from about 11.5 to 12.5 pounds per gallon of slurry.

One particular advantage, in addition to the low slurry densities available herein, is that the high water ratios produce low heats of hydration. Thus, the fine particle size hydraulic cement of this invention is quite useful when conducting cementing operations, and particularly primary cementing operations, adjacent to structures which may undergo undesired physical breakdown in the presence of produced heat. Examples of such structures include permafrost and gas hydrate zones.

Still another particular advantage accruing from using the ultra fine particle size Portland cement of this invention is the observed unexpected expansion of the cement during setting. This expansion property can help prevent the formation of microannuli when the cement is used in primary cementing operations and can help the formation of very tightly fitting plugs when the cement is used in squeeze cementing.

It is believed that this desirable expansive feature of the fine particle size Portland cement is due to the chemical content thereof and particularly to the high concentration of crystalline tricalcium aluminate ($C_3A$) and sulfates present therein. It is thought that a Portland cement having a maximum particle size of about 11 microns, a Blaine Fineness of preferably greater than about 10,000 $cm^2$/gram, a $C_3A$ crystalline content of preferably about 3.0 percent or more and a sulfate content of preferably about 1.0 percent or more will exhibit expansive characteristics desirable in an oil field cement.

Slurries of water and the fine particle size cement of this invention, as previously mentioned, are very useful to penetrate, fill and harden in fine holes, cracks and spaces such as might be expected to be found in well casing, cement sheaths, gravel packs and subterranean formations in the vicinity of a wellbore. By way of example, it is believed that such slurries are useful to penetrate subterranean formations having effective permeabilities as low as about 3000 to about 5000 millidarcies. Accordingly, a condition known as water coning, in which water from a subterranean formation enters the wellbore in a rising or coning fashion, can be terminated by squeezing a slurry of fine particle size cement of this invention into formations producing such water, wherein the formations to be penetrated can have effective permeabilities as low as 3000 to 5000 millidarcies.

In addition, a water slurry of the fine particle size cement of this invention can be utilized to terminate the unwanted flow of water through a zone in a gravel pack. In this regard such a slurry can be formulated to permeate and set in a gravel pack consisting of a packed sand bed wherein the sand in the pack has a particle size as low as 100 mesh (about 150 micron). Such a procedure can be utilized to plug channels in gravel packs created by flowing steam as well as by flowing water.

Still further, a water slurry of the fine particle size cement of this invention can be formulated to penetrate, plug and set in fine cracks in well pipe and in channels and microannulus spaces in and around the cement sheath wherein such fine cracks can be as narrow as about 0.05 millimeters (0.002 inches).

With regard to the above uses, but without being bound by the following slurry design aid, it is considered for commercial design purposes that a particle of given size in a suitable slurry as described herein can penetrate, fill and set in a crack, hole or void having a size of approximately 5 times greater than the size of the particle. Thus the 0.05 millimeter (50 micron) crack referred to above can be penetrated by a slurry of particles having a size of about 10 microns which is within the scope of the cement of this invention.

It was mentioned previously that the rate of hardening of the fine cement of this invention is related to the Blaine Fineness wherein the hardening rate increases as Blaine Fineness increases. In addition, the hardening rate is also related to the specific cementitious material being used and the temperature of the environment wherein the hardening reaction is proceeding. Thus fine particle size Portland cement, as hereinafter defined, hardens more rapidly in low temperature environments in the range of from about 30° F. to about 100° F. than does fine particle size slag cement, hereinafter defined. Also Portland cement hardens more rapidly at elevated temperatures than does slag cement.

When an ultra fine hydraulic cement slurry is used in well applications wherein the slurry is heated to temperatures in the range of from about 140° F. and higher, the cement slurry has been subject to flash gelation whereby the time that the slurry remains pumpable has been unpredictable. Even when an ultra fine cement slurry includes heretofore utilized set retarders such as lignosulfonates and other known retarders, premature gelation and setting has occurred.

As previously mentioned, Brothers, in U.S. Pat. No. 5,263,542, provided a set retarder comprised of a methylenephosphonic acid derivative in an attempt to solve the problem of premature gelation and to extend the set time of ultra fine cement at temperatures greater than 140° F. and up to about 250° F. These problems are again addressed and solved in accordance with the present invention by including in the ultra fine cement composition a set retarder comprised of a water soluble aliphatic compound containing at least 3 carbon atoms and at least one functional group selected from the groups consisting of phosphonic acid groups, phosphonate groups, carboxylic acid groups, carboxylate groups and mixtures thereof wherein at least one of said functional groups is a phosphonic acid group or a phosphonate group.

Compounds within the scope of the above definition preferred for use herein are further defined by the formula:

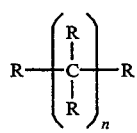 (1)

wherein R is —H,

or —P(OX)$_3$, X is —H, Na or K and n is 3, 4, 5, or 6 and further wherein at least one of said R groups is —P(OX)$_3$.

The compound most preferred for use herein is the partially neutralized sodium salt of the compound 2-phosphono-1,2,4 butanetricarboxylic acid, a 25 weight percent aqueous solution, having a pH of about 2.4, the formula of which is

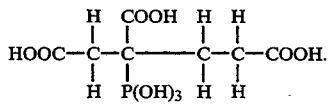

The acid form of the above mentioned preferred compound is commercially available from Miles, Inc. under the tradename "BAYHIBIT-AM" in a 50 percent by weight aqueous solution. A sodium salt is also available from Miles in powder form, a one percent aqueous solution of which has a pH of about 8.5. The preferred compound is made by neutralizing a 50 weight percent aqueous solution of the acid form with sodium hydroxide and diluting to a 25 weight percent aqueous solution having a pH of 2.4.

Depending upon the particular amount of the retarder included in the ultra fine cement slurry, the slurry remains pumpable for a predetermined period of time. Generally, the set retarder is included in the slurry in an amount in the range of from about 0.01 pound to about 5 pounds per 100 pounds of dry cement in the slurry. As has been the practice in the art, prior to the preparation and pumping of an ultra fine cement slurry including the set retarder of this invention, the particular amount of retarder to be included in the slurry for a desired pumping time can be pre-determined by testing.

Particularly suitable retarders falling within the definition set forth in formula (1) above include 2-phosphono-1,4 butane dicarboxylic acid,
2-phosphono-1,2 butane dicarboxylic acid,
2-phosphono-1,2,4 pentane tricarboxylic acid,
2-phosphono-1,2 pentane dicarboxylic acid,
2-phosphono-1,4 pentane dicarboxylic acid,
3-phosphono-1,5 pentane dicarboxylic acid and
3-phosphono-1,2 pentane dicarboxylic acid.

The set retarder useful herein is preferably employed in the salt form as an aqueous solution having a pH in the range of from about 2 to about 7. It is believed that the retarder can be transported as a non-hazardous material at a pH greater than 2.

The set retarder of this invention does not cause large changes in pumping time of a slurry as a result of relatively small changes in the amount of retarder used in a slurry. That is, it is not concentration sensitive. Accordingly, use of the retarder in a cementing operation under field conditions is not complicated by the need to perform extremely precise measuring operations in order to avoid either unexpectedly low or high pumping times. Thus, good retardation control is provided by this invention.

The set retarder of this invention, in laboratory tests, has exhibited pumping time results which are reproducible within acceptable limits. Set cement which included the set retarder in the slurry exhibits satisfactory compressive strength. Test results also indicate the presence of a substantially linear relationship between the concentration of set retarder employed in a slurry and pumping time.

The above described preferred set retarders are preferably included in an ultra fine cement slurry in an amount in the range of from about 0.1 to about 2 and most preferably in an amount in the range of from about 0.3 to about 1 pound per 100 pounds of dry cement.

In addition to the set retarder as described above, the ultra fine cement compositions of the present invention preferably includes a dispersing agent to facilitate the dispersion of individual ultra fine cement particles in water and to help prevent the formation of large agglomerated particles or lumping.

While a variety of dispersing agents can be used, a particularly suitable dispersing agent is a polymer prepared by the caustic-catalyzed condensation of formaldehyde with acetone or a substance derived from acetone wherein the polymer contains sodium sulfonate groups. Such a dispersing agent is commercially available from the Halliburton Company of Duncan, Okla., under the trade designation "CFR-3 TM" dispersing age, and is described in detail in U.S. Pat. No. 4,557,763 issued on Dec. 10, 1985 to George et al. The dispersing agent is generally added to the water utilized to form the ultra fine cement slurry whereby it is present in the slurry in an amount in the range of from about 0.5% to about 2.0% by weight of dry cement therein.

Another cement composition additive which is preferably included in the ultra fine cement compositions of this invention is a fluid loss control additive. A variety of such additives are available and can be used. A particularly preferred such additive is comprised of a copolymer of N,N-dimethylacrylamide and 2-acrylamido, 2-methyl propane sulfonic acid. The copolymer is commercially available from the Halliburton Company under the trade designation "HALAD TM -344" additive and is also described in U.S. Pat. No. 4,557,763. The copolymer is combined with an ultra fine cement composition in an amount in the range of from about 0.5% to about 2.0% by weight of dry cement therein.

Another preferred fluid loss control agent which can be used is a graft polymer comprised of a backbone of lignin or lignite having grafted thereto pendant groups comprising at least one of homopolymers, copolymers and terpolymers of 2-acrylamido-2-methylpropanesulfonic acid, acrylonitrile, N,N-dimethylacrylamide and their salts. Such a graft polymer fluid loss control agent is available from the Halliburton Company of Duncan, Okla., under the trade designation "HALAD®-413", and is described in U.S. Pat. No. 4,703,801 issued Nov. 3, 1987 to Fry et al. When used, the graft polymer is combined with an ultra fine cement composition in an amount in the range of from about 0.5% to about 2.0% by weight of dry cement.

Other commonly used additives in well cement compositions may also be utilized in the compositions of this invention including additives for reducing the density of the compositions such as nitrogen, perlite, fly ash, silica fume, microspheres and the like.

Also, in order to help prevent the loss of compressive strength of said cement over time, a condition referred to as compressive strength retrogression, silica flour can be included in the compositions. Generally, if silica flour is utilized it is added to the compositions of this invention in amounts in the range of from about 0.15 to about 1.0 pound of silica flour per pound of hydraulic cement used.

One preferred silica flour additive to help prevent compressive strength retrogression is available from Halliburton Company under the trademark "MICROSAND" silica flour, a high purity crystalline silica ground to a uniform particle size distribution. The average particle size of "MICROSAND" additive is 5 microns which renders it very useful with ultra fine cement. The preferred quantity of silica flour, such as "MICROSAND" silica flour, is an amount in the range of from about 0.2 pounds to about 0.8 pounds and preferably about 0.4 pounds per pound of dry cement.

As will be understood by those skilled in the art, a variety of other uses in the drilling, completion and production of wells not specifically mentioned herein can be made of the set retarded ultra fine cement compositions of this invention.

A particularly preferred set retarded ultra fine cement composition which remains pumpable for a predictable period of time at temperatures up to about 400° F. and higher is comprised of the following components:

(a) an ultra fine hydraulic cement having a particle size no greater than about 30 microns, a Blaine Fineness no less than about 6000 square centimeters per gram, 90 percent of the particles having a diameter no greater than about 25 microns, 50 percent of the particles having a diameter no greater than about 10 microns and 20 percent of the particles having a diameter no greater than about 6 microns;

(b) sufficient water to form a pumpable slurry (normally an amount in the range of from about 0.5 to about 5.0 pounds of water per pound of dry cement used);

(c) the set retarder of this invention present in the slurry in an amount in the range of from about 0.01 pounds to about 5.0 pounds per 100 pounds of dry cement therein;

(d) a dispersing agent comprised of a polymer prepared by the caustic-catalyzed condensation of formaldehyde with acetone or a substance derived from acetone wherein the polymer contains sodium sulfonate groups present in the slurry in an amount in the range of from about 0.5 pounds to about 2.0 pounds per 100 pounds of dry cement therein; and (e) a fluid loss control agent comprised of a copolymer of N,N-dimethylacrylamide and 2-acrylamido, 2-methyl propane sulfonic acid present in the slurry in an amount in the range of from about 0.5 pounds to about 2.0 pounds per 100 pounds of dry cement therein.

The methods of this invention for cementing a subterranean zone penetrated by a wellbore at a temperature in the range of from about 140° F. to about 400° F. comprise the steps of pumping a set retarded ultra fine cement composition of this invention into the subterranean zone, and then allowing the cement composition to set into a hard substantially impermeable mass in the zone.

In order to further illustrate the compositions and methods of this invention, the following examples are given.

In the examples set out below: The hydraulic cement employed was an ultra fine cement, as previously described, having a Blaine Fineness of about 13,000 cm$^2$/gram and an average particle size of about 3.2 microns wherein the largest particle size was not greater than about 15 microns.

The water employed to produce the cement slurries tested was deionized water.

A cement set time retarder was employed in the majority of the tests. Tests performed without a retarder are provided for comparison purposes. In some tests the cement retarder employed was a prior art retarder described in U.S. Pat. No. 5,263,542, specifically aminotri(methylenephosphonic acid). This prior art retarder is referred to in the examples as MMCR. In some of the tests a retarder of this invention, 2-phosphono-1,2,4-butanetricarboxylic acid or the sodium salt thereof, was employed. The pH of the acid form, identified as PBTC, in a 50 weight percent aqueous solution was less than 1.0. The pH of a 1% aqueous solution of the powdered sodium salt was 8.5 and is identified as SPBTC1. The pH of the partially neutralized sodium salt form, identified as SPBTC2, in a 25 weight percent aqueous solution, was about 2.4.

A dispersing agent was employed in some of the compositions tested. The dispersant was a polymer prepared by the caustic-catalyzed condensation of formaldehyde with a substance derived from acetone wherein the polymer contains sodium sulfonate groups. The dispersant is available from Halliburton Company as "CFR-3" dispensing agent and is described in U.S. Pat. No. 4,557,763.

"MICROSAND" additive, discussed above, to prevent the loss of compressive strength of set cement at high temperature, was added to the slurries tested.

The various compositions tested are set out in Tables I, II-A and IV-A, below.

EXAMPLE 1

Ultra fine cement compositions were prepared and tested for thickening time at a temperature of 187° F. The recipes of the compositions tested and the test results are set out in Table I, below.

Some of the compositions included the acid form of the retarder (PBTC) and some included the salt form (SPBTC1). Also, some of the compositions included a dispersant and some did not.

It should be noted that all concentrations noted in Table I refer to the specific ingredient in the undiluted (100% active) form even though the ingredient, for convenience, may have been added in a diluted form.

It is further noted that the retarder salt (SPBTC1) referred to in Table I was produced from a powder, a 1 weight percent aqueous solution of which having a pH of about 8.5.

Referring now to Table I, it is seen that thickening time can be substantially linearly increased by increasing the concentration of retarder in the slurry regardless of the form of the retarder, or the water ratio or the presence or absence of dispersant. It should also be noted that desirable pumping times were obtainable at the test temperature at various water ratios, retarder form and concentration and dispersant content.

Specifically, comparing the results obtained on compositions 1, 2, and 3, with those obtained on compositions 4, 5, and 6, reveals that the dispersant apparently has a retardant effect in combination with the retarder. Similar observations are evident when comparing compositions 7, 8, and 9, with compositions 10, 12, and 13.

Comparing the results obtained on compositions 9, 13, and 15 indicates that the salt form of the retarder, at least with respect to the salt form used in Table I, has a lesser retarding effect than the acid form.

sodium hydroxide and diluting to a 25 weight percent aqueous solution having a pH of 2.4.

It is further noted that the compositions in Table II-A include "MICROSAND" silica flour. For test temperatures of less than 200° F. the concentration of "MICROSAND" slica flour was 40 pounds per 100 pounds of dry cement. For test temperatures greater than 200° F. the concentration of "MICROSAND" silica flour was 60 pounds per 100 pounds of dry cement.

The observations made with respect to the results shown in Table I are also to a substantial degree observed in Tables II-A and II-B.

TABLE I

| Ultra Fine Cement Compositions and Thickening Times | | | | |
|---|---|---|---|---|
| | Water | Retarder 1g/100 lb dry cement | | Dispersant | Thickening Time |
| Composition | lb/100 lb dry cement | PBTC | SPBTC1 | lb/100 lb dry cement | @ 187° F., Hours |
| 1 | 99.96 | 0.5 | 0 | 0 | 2.57 |
| 2 | 99.96 | 0.6 | 0 | 0 | 2.33 |
| 3 | 99.96 | 0.75 | 0 | 0 | 5.17 |
| 4 | 99.96 | 0.5 | 0 | 1.0 | 3.45 |
| 5 | 99.96 | 0.6 | 0 | 1.0 | 5.03 |
| 6 | 99.96 | 0.75 | 0 | 1.0 | 9.12 |
| 7 | 174.93 | 0.3 | 0 | 0 | 1.9 |
| 8 | 174.93 | 0.4 | 0 | 0 | 4.2 |
| 9 | 174.93 | 0.5 | 0 | 0 | 8.73 |
| 10 | 174.93 | 0.3 | 0 | 1.0 | 3.7 |
| 11 | 174.93 | 0.35 | 0 | 1.0 | 5.4 |
| 12 | 174.93 | 0.4 | 0 | 1.0 | 7.3 |
| 13 | 174.93 | 0.5 | 0 | 1.0 | 12.23 |
| 14 | 174.93 | 0.6 | 0 | 1.0 | — |
| 15 | 174.93 | 0 | 0.5 | 1.0 | 3.83 |
| 16 | 174.93 | 0 | 0.75 | 1.0 | 17.53 |
| 17 | 174.93 | 0 | 1.0 | 1.0 | >22 |

EXAMPLE 2

Ultra fine cement compositions were prepared and tested for thickening time at various test temperatures from 140° F. to 400° F. The recipes of the compositions tested are set out in Table II-A. The test results are set out in Table II-B.

Some of the compositions included the acid form of the retarder (PBTC) and some included the salt form (SPBTC2). All of the compositions included one pound of dispersant per 100 pounds of dry cement.

It should be noted that all concentrations noted in Table II-A refer to the specific ingredient in undiluted (100% active) form even though the ingredient, for convenience, may have been added in diluted form.

It is further noted that the retarder salt (SPBTC2) referred to in Table II-A was prepared by neutralizing a 50 weight percent aqueous solution of PBTC with

TABLE II-A

| Ultra Fine Cement Compositions and Thickening Times | | | | |
|---|---|---|---|---|
| | Water | Retarder lb/100 lb dry cement | | "Microsand" silica flour |
| Composition | lb/100 lb dry cement | PBTC | SPBTC2 | lb/100 lb dry cement |
| 18 | 141.61 | 0.3 | 0 | 40 |
| 19 | 141.61 | 0.4 | 0 | 40 |
| 20 | 141.61 | 0.5 | 0 | 40 |
| 21 | 141.61 | 0.6 | 0 | 40 |
| 22 | 178.262 | 0.5 | 0 | 60 |
| 23 | 178.262 | 0.6 | 0 | 60 |
| 24 | 178.262 | 0.7 | 0 | 60 |
| 25 | 178.262 | 0.9 | 0 | 60 |
| 26 | 178.262 | 1.0 | 0 | 60 |
| 27 | 178.262 | 1.1 | 0 | 60 |
| 28 | 178.262 | 1.5 | 0 | 60 |
| 29 | 178.262 | 1.75 | 0 | 60 |
| 30 | 178.262 | 2.0 | 0 | 60 |
| 31 | 141.61 | 0.4 | 0 | 40 |
| 32 | 141.61 | 0.5 | 0 | 40 |
| 33 | 178.262 | 0.6 | 0 | 60 |
| 34 | 178.262 | 1.0 | 0 | 60 |
| 35 | 141.61 | 0 | 0.3 | 40 |
| 36 | 141.61 | 0 | 0.4 | 40 |
| 37 | 141.61 | 0 | 0.5 | 40 |
| 38 | 141.61 | 0 | 0.6 | 40 |
| 39 | 141.61 | 0 | 0.7 | 40 |
| 40 | 178.262 | 0 | 0.6 | 60 |
| 41 | 178.262 | 0 | 0.75 | 60 |
| 42 | 178.262 | 0 | 0.9 | 60 |
| 43 | 178.262 | 0 | 1.0 | 60 |
| 44 | 178.262 | 0 | 2.0 | 60 |
| 45 | 178.262 | 0 | 3.0 | 60 |
| 46 | 141.61 | 0 | 0.5 | 40 |
| 47 | 141.61 | 0 | 0.6 | 40 |
| 48 | 178.262 | 0 | 0.75 | 60 |

TABLE II-B

Thickening Times
Ultra Fine Cement Compositions

| Composition | 140° F. | 160° F. | 190° F. | 220° F. | 250° F. | 300° F. | 350° F. | 400° F. |
|---|---|---|---|---|---|---|---|---|
| 18 | — | 1.33 | — | — | — | — | — | — |
| 19 | — | 3.5 | 1.33 | — | — | — | — | — |
| 20 | — | 7.17 | 3.03 | — | — | — | — | — |
| 21 | — | — | 6.1 | — | — | — | — | — |
| 22 | — | — | — | 2.8 | — | — | — | — |
| 23 | — | — | — | 3.83 | — | — | — | — |
| 24 | — | — | — | 6.83 | — | — | — | — |
| 25 | — | — | — | — | 2.97 | — | — | — |
| 26 | — | — | — | — | 5.93 | — | — | — |
| 27 | — | — | — | — | 9.63 | — | — | — |
| 28 | — | — | — | — | — | 3.5 | — | — |
| 29 | — | — | — | — | — | 12.07 | — | — |
| 30 | — | — | — | — | — | — | 6.65 | 3.32 |
| 31 | — | 4.03 | — | — | — | — | — | — |
| 32 | — | — | 2.23 | — | — | — | — | — |
| 33 | — | — | — | 4.02 | — | — | — | — |
| 34 | — | — | — | — | 4.7 | — | — | — |
| 35 | 2.27 | — | — | — | — | — | — | — |
| 36 | 4.0 | 2.27 | — | — | — | — | — | — |
| 37 | 5.63 | 3.75 | 2.33 | — | — | — | — | — |
| 38 | — | 4.87 | 4.32 | — | — | — | — | — |
| 39 | — | — | 7.38 | — | — | — | — | — |
| 40 | — | — | — | 2.13 | — | — | — | — |
| 41 | — | — | — | 3.38 | — | — | — | — |
| 42 | — | — | — | 6.85 | — | — | — | — |
| 43 | — | — | — | — | 3.5 | — | — | — |
| 44 | — | — | — | — | — | 3.67 | 2.0 | — |
| 45 | — | — | — | — | — | — | 6.25 | 4.18 |
| 46 | — | 2.95 | — | — | — | — | — | — |
| 47 | — | — | 3.65 | — | — | — | — | — |
| 48 | — | — | — | 4.17 | — | — | — | — |

EXAMPLE 3

Selected compositions from Tables I and II-A were tested for compressive strength at various temperatures. The compositions tested and the test results are set out in Table III.

TABLE III

24 Hour Compressive Strength of Selected
Ultra Fine Cement Compositions

| Composition | 187° F. | 200° F. | 250° F. | 272° F. |
|---|---|---|---|---|
| 4 | — | 580 | — | — |
| 10 | 225 | — | — | 213 |
| 14 | 197 | — | — | 215 |
| 37 | — | 836 | — | — |
| 38 | — | 795 | 1973 | — |
| 41 | — | — | 1742 | — |

EXAMPLE IV

Ultra fine cement compositions were prepared and tested for thickening time at various test temperatures from 140° F. to 300° F. The recipes of the compositions tested are set out in Table IV-A. The test results are set out in Table IV-B.

The compositions either contained a prior art retarder (MMCR) as previously described (49–64) or no retarder at all (65 and 66). All the compositions included both a dispersant and "MICROSAND" silica flour as described above with respect to Table II-A.

The compositions in Table IV-A and the results shown in Table IV-B are provided for comparison purposes only and are not examples of compositions of this invention.

TABLE IV-A

Ultra Fine Cement Compositions

| Composition | Water lb/100 lb dry cement | Retarder lb/100 lb dry cement MMCR | "Microsand" silica flour lb/100 lb dry cement |
|---|---|---|---|
| 49 | 99.96 | 0.17 | 40 |
| 50 | 99.96 | 0.26 | 40 |
| 51 | 99.96 | 0.35 | 40 |
| 52 | 99.96 | 0.44 | 40 |
| 53 | 141.61 | 0.1 | 40 |
| 54 | 141.61 | 0.2 | 40 |
| 55 | 141.61 | 0.3 | 40 |
| 56 | 141.61 | 0.4 | 40 |
| 57 | 141.61 | 0.5 | 40 |
| 58 | 141.61 | 0.6 | 40 |
| 59 | 178.262 | 0.75 | 60 |
| 60 | 178.262 | 1.0 | 60 |
| 61 | 178.262 | 2.0 | 60 |
| 62 | 141.61 | 0.3 | 40 |
| 63 | 141.61 | 0.4 | 40 |
| 64 | 178.262 | 0.75 | 60 |
| 65 | 141.61 | 0 | 40 |
| 66 | 178.262 | 0 | 60 |

TABLE IV-B

Thickening Times
Ultra Fine Cement

| Composition | 140° F. | 160° F. | 190° F. | 220° F. | 250° F. | 300° F. |
|---|---|---|---|---|---|---|
| 49 | 1.63 | — | — | — | — | — |
| 50 | 5.25 | — | — | — | — | — |
| 51 | 6.90 | — | — | — | — | — |
| 52 | 10.17 | — | — | — | — | — |
| 53 | 1.37 | — | — | — | — | — |
| 54 | 3.02 | — | — | — | — | — |
| 55 | 5.52 | 4.12* | — | — | — | — |
| 56 | 11.37 | 6.98* | 3.0* | — | — | — |
| 57 | — | — | 6.62* | — | — | — |

TABLE IV-B-continued

| | Thickening Times Ultra Fine Cement | | | | | |
|---|---|---|---|---|---|---|
| | Thickening Time, Hours | | | | | |
| Composition | 140° F. | 160° F. | 190° F. | 220° F. | 250° F. | 300° F. |
| 58 | — | — | 9.52* | — | — | — |
| 59 | — | — | — | 7.9 | — | — |
| 60 | — | — | — | — | 4.8 | — |
| 61 | — | — | — | — | — | 5.43 |
| 62 | 7.10 | — | — | — | — | — |
| 63 | — | 4.02 | 4.22 | — | — | — |
| 64 | — | — | — | 10.53 | — | — |
| 65 | — | 0.68 | — | — | — | — |
| 66 | — | — | — | 0.72 | — | — |

*Slurry formed premature gel

What is claimed is:

1. A method of cementing a subterranean zone penetrated by a wellbore at a temperature in the range of from about 40° F. to about 400° F. comprising the steps of:
    pumping a set retarded ultra fine cement composition into said zone, said cement composition consisting essentially of,
    an ultra fine hydraulic cement having a particle size no greater than about 30 microns and a Blaine Fineness no less than about 6000 square centimeters per gram.
    sufficient water to form a pumpable slurry, and
    a set retarder comprised of a water soluble aliphatic compound containing at least three carbon atoms and at least one phosphonic acid or phosphonate group present in said slurry in an amount in the range from about 0.01 to about 5.0 pounds per 100 pounds of dry cement therein.

2. The method of claim 1 wherein said water soluble aliphatic compound is defined by the formula

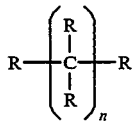

(1)

wherein R is —H,

or —P(OX)$_3$, X is —H, Na or K and n is 3, 4, 5, or 6.

3. The method of claim 1 wherein said water soluble compound is selected from the group consisting of
    2-phosphono-1,4 butane dicarboxylic acid,
    2-phosphono-1,2 butane dicarboxylic acid,
    2-phosphono-1,2,4 pentane tricarboxylic acid,
    2-phosphono-1,2 pentane dicarboxylic acid,
    2-phosphono-1,4 pentane dicarboxylic acid,
    3-phosphono-1,5 pentane dicarboxylic acid and
    3-phosphono-1,2 pentane dicarboxylic acid.

4. The method of claim 2 wherein said aliphatic compound has a pH in the range of less than about 1 to about 8.5.

5. The method of claim 4 wherein said aliphatic compound has a pH in the range of from about 2 to 7, X is —H or Na and said compound is present in said slurry in an amount in the range of from about 0.1 to about 2 pounds of dry cement.

6. The method of claim 2 wherein said aliphatic compound is selected from 1, 2, 4 butanetricarboxylic acid and the sodium salt thereof having a pH of about 2.4 and is present in said slurry in an amount in the range of from about 0.3 pound to about 1 pound per 100 pounds of dry cement.

7. The method of claim 6 wherein said cement composition is further characterized to include a dispersing agent comprised of a polymer prepared by the caustic-catalyzed condensation of formaldehyde with acetone or a substance derived from acetone wherein said polymer contains sodium sulfonate groups present in an amount in the range of from about 0.5% to about 2.0% by weight of dry cement therein.

8. The method of claim 7 wherein said cement composition is further characterized to include a fluid loss control agent comprised of a copolymer of N,N-dimethylacrylamide and 2-acrylamido, 2-methyl propane sulfonic acid present in an amount in the range of from about 0.5% to about 2.0% by weight of dry cement therein.

* * * * *